INVENTORS
Claus Waker
Helbring Schültz
Fritz Fend

Sept. 12, 1967   C. WAKER ET AL   3,340,747
CRANKSHAFT ASSEMBLY

Filed March 24, 1965   2 Sheets-Sheet 2

INVENTORS
Claus Waker
Helbring Schültz
Fritz Fend
By Richard

3,340,747
CRANKSHAFT ASSEMBLY
Claus Waker and Helbring Schültz, Schweinfurt am Main, and Fritz Fend, Regensburg, Germany, assignors to Fichtel & Sachs A.G., Schweinfurt am Main, Germany, a corporation of Germany
Filed Mar. 24, 1965, Ser. No. 442,415
Claims priority, application Germany, Mar. 25, 1964, F 42,427
10 Claims. (Cl. 74—598)

This invention relates to crankshafts of the type employed in internal combustion engines, and particularly to a crankshaft assembly in which the rear or output end of the shaft may be attached to the remainder of the crankshaft assembly after the same is installed in the crankcase.

It was necessary heretofore to provide the rear main bearing of the crankshaft, usually an anti-friction bearing, with an inner ring that is axially slidable on the crankshaft if it was intended to join the output end of the crankshaft to the otherwise completed crankshaft assembly. The inner bearing ring is under circumferential stress during service, and therefore tends to rotate on the output end of the crankshaft. The resulting relative movement of the surfaces of a movable ring and of the shaft which are engaged under high radial pressure and are not lubricated causes fretting corrosion and substantially shortens the useful life of the ring and/or of the shaft end.

The primary object of this invention is the provision of a crankshaft assembly in which the output end of the crankshaft may be attached to the other elements of the assembly after these elements are installed in the crankcase.

With this object and others in view, as will hereinafter become apparent, the invention provides the rear cheek of the rearmost crankshaft throw with a projection which has an axis and on which the inner ring of the rear main bearing is coaxially and fixedly fastened. The driven or output shaft portion of the crank shaft is directly fastened in locking engagement to the aforementioned rear cheek which also carries a crank pin radially offset from the common axis of the output shaft portion and the bearing ring.

The exact nature of this invention as well as other objects and advantages thereof will be readily apparent from consideration of the following specification relating to the drawing in which.

Figure 1:
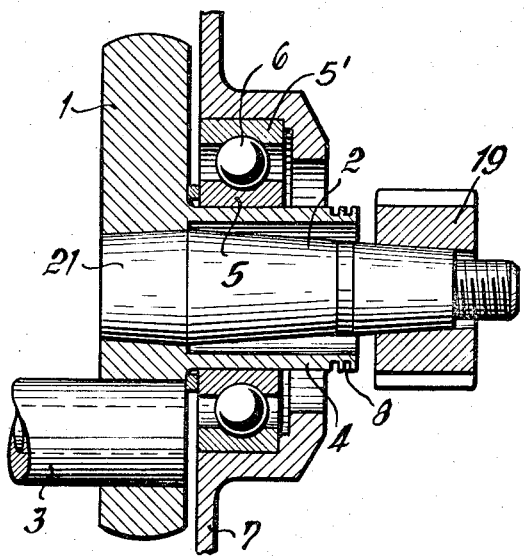
FIG. 1 shows a crankshaft assembly of the invention in fragmentary elevational section on the shaft axis.

Referring now to the drawing in detail, and initially to FIG. 1, there is seen as much of the rear end of an internal combustion engine as is necessary for an understanding of this invention. The rear cheek 1 of the rear crankshaft throw, the output end 2 of the crankshaft, and a crank pin 3 only are illustrated. The front end of the crankshaft may be conventional, and has not been shown.

The crank cheek 1 carries an integral tubular projection 4 coaxial with the shaft portion 2. The inner ring 5 of a ball bearing 6 is fixedly attached to the outer cylindrical face of the projection 4 by shrink fit or in any other desired manner. The outer ring 5' of the bearing 6 is attached to the crankcase 7. The portion of the projection 4 which axially extends outward of the crankcase 7 has two circular grooves 8 which are separated by a rib.

The inner axial end 21 of the shaft portion 2 tapers conically in a direction inward of the crankcase 7, the taper being very small, 2:50 or less, and amounting to about 1:50 in the illustrated embodiment. The end 21 is received in a conforming axial passage of the cheek 1. The central axial section of the shaft portion 2 tapers outward of the crankcase 7 and is radially spaced from the projection 4. The outer end of the shaft portion 2 is of reduced diameter and threaded, as is conventional, and a sprocket 19 is mounted on the shaft portion adjacent the threaded section.

Figure 2:
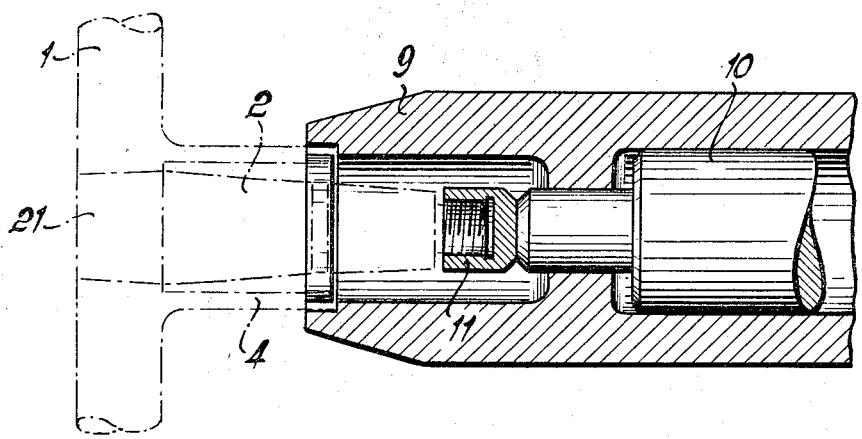
FIG. 2 illustrates a device for inserting the output end of the crankshaft in the otherwise completed assembly, the view corresponding to that of FIG. 1.

In assembling the device shown in FIG. 1, the non-illustrated front end of the crankshaft, the crank pin 3, and the crank cheek 1 are installed in the crankcase 7, the cheek being supported on the crankcase by the ball bearing 6. The shaft portion 2 may be inserted last by means of the device illustrated in FIG. 2, which also shows the relevant portions of the apparatus of FIG. 1 in phantom view.

The shaft inserting device has a rigid frame 9 adapted conformingly to engage the grooves 8 of the projection 4, and thereby to align the device with the axis of the shaft. A ram 10 is axially guided in the frame 9. Axial movement of the ram 10 is actuated by compressed air in a conventional manner, not further illustrated.

When assembly of the crankshaft is to be completed, the end 21 of the shaft portion 2 is manually placed in the conforming axial passage of the cheek 1, the threads at the outer end of the shaft portion 2 are covered by a protecting cap 11, and the frame 9 is engaged with the grooves 8. Compressed air is then admitted to the non-illustrated actuator of the ram 10, and the shaft portion 2 is driven home in the crank cheek 1. Because of the slight taper of the end 21, the pressure fit is sufficient to provide a fixed connection between the shaft portion 2 and the cheek 1. With a taper ratio of 1:50, the ram 10 should be capable of delivering a force of about 20,000 lbs.

The invention thus makes it possible to assemble internal combustion engines with all internal elements of their crankshafts, and to provide them later in a very convenient manner with output shaft portions of desired length or configuration to meet the requirements of a specific application.

Figure 3:
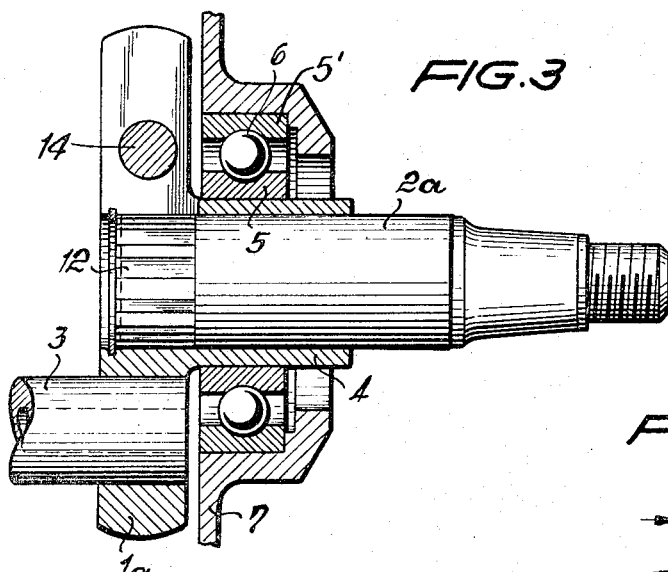
FIG. 3 shows a modified crankshaft assembly of the invention in section on the line III—III in FIG. 4.
Figure 4:
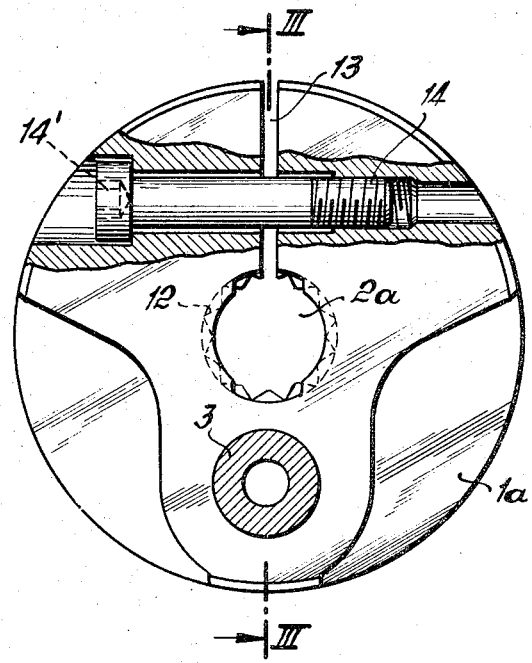
FIG. 4 illustrates a crank cheek of the assembly of FIG. 3 in front elevation, a portion of the cheek being broken away to show internal structure.

The crankshaft assembly shown in FIGS. 3 and 4 has a radially split rear cheek 1a. The output portion 2a of the crankshaft has a cylindrical inner part which passes through the tubular projection 4 of the cheek 1a in slidable engagement, and is secured to the cheek by serrations 12. A slot 13 extends in the cheek 1a radially outward from the passage in which the serrated end of the shaft portion 2a is received. A clamping screw 14 connects the two circumferential portions of the cheek 1a on either side of the slot 13. The head of the screw abuts against a corresponding face of one cheek portion, and the shank of the screw 14 threadedly engages the other cheek portion. The cheek may thereby be tightened about the serrated end of the shaft portion 2a.

The projection 4 carries the ball bearing 6 by means of which the crankshaft is rotatably supported in the crankcase 7. It also holds the shaft portion 2a in proper axial alignment with the remainder of the crankshaft assembly prior to and during tightening of the screw 14.

The head of the screw 14 has a hexagonal recess 14' for insertion of a key, and the crankcase 7 has to be provided with an access opening for the key and with a cover for normally covering the opening, these details not being shown in the drawing.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A crankshaft assembly comprising, in combination:
 (a) a crank cheek formed with a recess having an axis;
 (b) a tubular projection coaxially fixed on said cheek, said projection defining an inner cavity about said axis and having an outer face;
 (c) bearing means fixedly and coaxially fastened on said outer face for rotatably securing said cheek to a crankcase;
 (d) a driven shaft member having an axially terminal portion partly received in said cavity and partly received in said recess, cross section of said terminal portion being not greater than the cross section of said cavity, and the remainder of said shaft member extending outward of said cavity in a direction away from said crank cheek;
  (1) the part of said shaft member received in said recess being fastened to said cheek in locking engagement with the same; and
  (2) the part of said shaft member received in said cavity being dimensioned for free sliding movement in the cavity; and
 (e) a crank pin on said cheek, said pin having an axis radially offset from the axis of said opening.

2. An assembly as set forth in claim 1, wherein said recess flares in an axial direction toward said projection, and said part is conformingly received in said recess.

3. An assembly as set forth in claim 1, further comprising a crankcase rotatably secured to said cheek by said bearing means and enclosing said cheek and said crank pin, said tubular projection extending axially outward of said crankcase in a direction away from said cheek.

4. An assembly as set forth in claim 3, wherein the portion of said projection extending outward of said crankcase is formed with a radially open recess.

5. An assembly as set forth in claim 4, wherein said recess is an annular groove about said axis.

6. An assembly as set forth in claim 2, wherein said recess flares and the part of said shaft member received in said recess is tapered at a ratio of not more than 2 to 50.

7. An assembly as set forth in claim 1, wherein said recess constitutes an axial passage through said cheek, and the cheek is formed with a slot extending from said passage in a radial direction, the assembly further comprising clamping means adjustably connecting respective portions of said cheek at opposite sides of said slot for tightening said cheek about said terminal portion.

8. An assembly as set forth in claim 7, wherein said terminal portion is serrated.

9. An assembly as set forth in claim 1, wherein said shaft member has an axial portion axially coextensive with said projection and radially spaced from the same.

10. An assembly as set forth in claim 1, further comprising attaching means on a portion of said projection extending axially from said bearing means away from said cheek for attaching a shaft inserting device to said projection.

References Cited
UNITED STATES PATENTS

| | | | |
|---|---|---|---|
| 2,606,541 | 8/1952 | Lutz | 123—195 |
| 2,630,881 | 11/1953 | Bosma | 123—195 |

MARTIN P. SCHWADRON, *Primary Examiner.*

FRANK SUSKO, *Examiner.*